United States Patent
Ruth et al.

(10) Patent No.: US 6,309,751 B1
(45) Date of Patent: Oct. 30, 2001

(54) SUBSTRATE COATED WITH POWDERED NON-CRYSTALLINE AND CRYSTALLINE EPOXY RESINS

(75) Inventors: William G. Ruth, Morgantown; Stacy L. Greth; Carryll A. Seelig, both of Reading; Dean A. Schreffler, Hamburg, all of PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/605,268

(22) Filed: Jun. 28, 2000

Related U.S. Application Data

(62) Division of application No. 09/307,541, filed on May 7, 1999, now Pat. No. 6,140,430.

(51) Int. Cl.$^7$ .............................. B32B 15/08; C08L 63/02
(52) U.S. Cl. ......................... 428/418; 428/413; 428/417; 427/386; 525/524; 525/525; 525/526; 525/934
(58) Field of Search ............................ 427/386; 428/418, 428/413, 417; 525/524, 525, 526, 934

(56) References Cited

U.S. PATENT DOCUMENTS

| | | | |
|---|---|---|---|
| 4,421,897 | * 12/1983 | Gutekunst et al. | 525/119 |
| 4,675,443 | * 6/1987 | Bertram et al. | 564/155 |
| 4,687,832 | * 8/1987 | Ehara et al. | 528/97 |
| 4,764,581 | * 8/1988 | Muller et al. | 528/100 |
| 5,414,058 | 5/1995 | Ono et al. | 525/523 |

FOREIGN PATENT DOCUMENTS 61-55123 A * 3/1986 (JP).
63-227622 A * 9/1988 (JP).

* cited by examiner

*Primary Examiner*—Robert E. L. Sellers

(57) ABSTRACT

To a substrate such as brass is applied a powder coating comprising
  a) at least one non-crystalline epoxy resin,
  b) at least one crystalline epoxy resin such as tetramethylbisphenol diglycidyl ether in an amount sufficient to reduce or eliminate bubble entrapment within the cured coating when cured at a temperature of below about 350° F. (about 177° C.), and
  c) a curing agent such as dicyandiamide.

3 Claims, No Drawings

SUBSTRATE COATED WITH POWDERED NON-CRYSTALLINE AND CRYSTALLINE EPOXY RESINS

This application is a division of application Ser. No. 09/307,541 filed May 7, 1999, U.S. Pat. No. 6,140,430.

FIELD OF THE INVENTION

This invention relates to a thermosetting epoxy powder coating composition and, more particularly, to an epoxy powder coating composition adapted to prevent bubble entrapment within the coating film formed therefrom during thermal curing at low temperatures.

BACKGROUND OF THE INVENTION

Brass is a widely used material of construction for many articles of commerce. Parts formed from brass. generally require a clear coat finish to enhance their luster and appearance and achieve protection against wear or the environment. Solvent-borne liquid coatings have been tried for such purposes, but they fail to deliver the needed performance. Solvent-borne coatings also contain alarmingly high levels of hazardous volatile organic compounds which tend to flash away during curing, making it necessary to contain and collect the vapor of volatile ingredients which is rather costly.

Fusion bonded, thermosetting powder coating compositions have also been used to coat brass parts. Powder coatings offer a number of advantages over liquid coatings. For instance, corrosion and scratch resistance is much superior to that of liquid coatings. In addition, powder coatings are virtually free of the harmful fugitive organic solvents normally present in liquid coatings and, accordingly, give off little, if any, volatiles during curing, which eliminates solvent emission problems and dangers to the health of workers employed in coating operations.

Because brass parts, for example, brass plated zinc die cast parts, are susceptible to outgassing upon heating, thermosetting powder coatings that are capable of curing at low temperatures, e.g., below about 350° F., are generally preferred to minimize substrate outgassing during curing and permanent scarring of the finish coating. Low cure temperatures are also desired, since brass tends to discolor or tarnish at higher temperatures.

Among the commercially available low temperature cure thermosetting powder coatings, GMA acrylic powder coatings have been the most widely used by the brass finishing industry. GMA acrylics offer coatings with exceptional smoothness and clarity, but also suffer from a number of drawbacks including poor adhesion and rather high cost which is becoming increasingly difficult for the brass finishing industry to bear. Attempts have been made to replace the GMA acrylics with traditional thermosetting epoxy powder coatings, such as those based on standard non-crystalline epoxy resins, e.g., bisphenol A type epoxy resins, standard curing agents for epoxy resins, e.g., dicyanodiamide, along with standard catalysts, e.g., 2-methyl imidazole. While epoxies offer improved adhesion and reduced cost, curing of these coatings at the desired low temperature cure conditions, generally leads to bubble entrapment within the finish coating, which is particularly troublesome from an appearance and film quality standpoint.

Bubble entrapment is believed to occur during powder application. In particular, as the powder coating is applied to the substrate, it is believed that air is entrapped within the powder particles as they are deposited on the substrate. When the powder begins to melt, flow and eventually cure, the air must escape from the coating before the finish coating hardens or it will be trapped as tiny bubbles dispersed throughout the coating. With traditional thermosetting epoxy powder coatings, the latter effect tends to occur at the desired low temperature cure conditions, which is believed to be due, at least in part, to the rather high melt viscosities experienced at such tempartures. In a clear coating, those bubbles are especially problematic in that they tend to create an unwanted hazy appearance that interferes with the distinctness of image of the finish coating, i.e., the sharpness of image reflected by a coating's surface. Brass coatings, however, should have a high and visually consistent distinctness of image to enable one to see through the finish coating as if looking at a polished brass part.

What is needed is a thermosetting epoxy powder coating composition adapted to cure at low temperatures below about 350° F. as well as prevent bubble entrapment within the finish coating during heat curing at said low temperatures.

SUMMARY OF THE INVENTION

It is, therefore, a primary object of this invention to provide a thermosetting epoxy powder coating composition that does not suffer from the forgoing drawbacks.

It is another object of this invention to provide a thermosetting epoxy powder coating composition adapted to cure at low temperatures as well as prevent bubble entrapment and resultant visible haze within the finish coating during curing at said low temperatures.

It is yet another object of this invention to provide a thermosetting epoxy powder coating composition that has a relatively low viscosity when melted for curing, so that it can readily flow, coalesce and degas at low temperatures before reaching a thermoset state.

It is a further object of this invention to provide a thermosetting epoxy powder coating composition of the aforesaid character that is still melt-processable in an extruder under standard conditions and storage stable at ambient temperatures.

It is a related object of this invention to provide a coated substrate, preferably a clear coated brass substrate, having a thermosetting powder coating composition of the aforesaid character coated and cured thereon while the substrate is at a temperature generally below the substrate outgassing and/or degradation temperature, with the resulting finish coating, remarkably, having little or no bubble entrapment and resultant visible haze therein.

The foregoing objects of the invention are accomplished through an improvement in a low temperature thermosetting epoxy powder coating composition, especially in a clear composition that is essentially free of opaque pigments and fillers. The powder coating composition in accordance with this invention comprises a film-forming particulate blend of a non-crystalline epoxy resin, a curing agent for the epoxy resin, and a cure catalyst. The improvement being that small amounts of a crystalline epoxy resin are included in the composition to improve the low temperature degassing properties of the composition and thus reduce or eliminate bubble entrapment within the coating film formed therefrom upon curing, particularly at the rather low cure temperatures demanded by certain substrates, especially those made of brass, yet without detracting from the ability of the composition to be melt processed and stored in a conventional manner. The thermosetting powder coating composition of this invention is, therefore, useful in providing essentially haze-free coatings on substrates demanding lower cure temperatures, such as brass parts. Our discovery herein that the addition of small amounts of crystalline resin prevents bubble entrapment at low cure temperatures in the above formulation was truly unexpected. There is no indication of this unexpected benefit in the literature. U.S. Pat. No. 5,414,058 (Ono) makes no mention of improvements in powder degassing. Moreover, we are not aware of any prior art relating to blends of non-crystalline and crystalline epoxy resins for use in thermosetting powder coatings which achieve the novel film properties described herein.

In accomplishing the foregoing objects of this invention, there is also provided a method for obtaining an essentially haze-free coating, preferably a clear coating, having little or no optical bubble defects on a substrate surface susceptible to outgassing and/or degradation upon heating at elevated temperatures, preferably on a surface made of brass, comprising applying a low temperature powder coating composition of the aforesaid character on a substrate surface, and curing the powder coating on the substrate at temperatures sufficient to cure the powder coating composition and below the outgassing and/or degradation temperature of the substrate. Also provided by this invention is a substrate susceptible to outgassing and/or degradation upon heating, preferably a brass substrate, coated, preferably clear coated, with an essentially haze-free layer of a cured thermosetting epoxy powder coating composition which in its uncured state comprises the composition of the aforesaid character.

The various objects, features and advantages of this invention will become more apparent from the following description and appended claims.

DETAILED DESCRIPTION OF THE PREFERRED EMBODIMENTS

Throughout this specification, all parts. and percentages specified herein are by weight unless otherwise stated. Also herein, the non-crystalline epoxy resin component plus crystalline epoxy resin component are considered to be the "resin system" and equal to 100 parts. Levels of other components are calculated as parts relative to 100 parts of the resin system ("phr"). Further, as used herein, the term "non-crystalline epoxy" (otherwise referred to as "amorphous epoxy") broadly defines epoxy resins which show no, or trace, crystallization or melting point as determined by differential scanning calorimetry (DSC). While the term "crystalline epoxy" used herein denotes crystalline as well as semi-crystalline materials and broadly defines epoxy resins with a discernable crystallization or melting point by DSC.

According to the present invention, there are provided thermosetting epoxy powder coatings that have improved low temperature degassing properties and yield essentially bubble-free and haze-free when cured at said low temperatures, while the powders from which the coatings are made still have good storage stability and melt-processability. The epoxy powder coating compositions of this invention typically include a non-crystalline epoxy resin, a curing agent, and a catalyst, with the improvement being that a small amount of crystalline epoxy resin sufficient to prevent bubble entrapment within the cured coating film formed therefrom is included in the resin system of the composition in place of some non-crystalline epoxy resin. By "bubble-free", what is meant is that trapped bubbles are reduced to such an extent that a visible haze cannot be discerned by the unaided human eye in the coating. It is possible that closer inspection may reveal tiny bubbles within the coating; however, they are not sufficient to interfere with the aesthetic appearance and desired clarity of the coating as required by conventional standards.

The non-crystalline epoxy resins useful herein include, without limitation, bisphenol A type epoxy resins which are diglycidyl ethers of bisphenol A, usually produced by the reaction of epichlorohydrin and bisphenol A. The bisphenol A type epoxy resins used herein are preferably solid resins which have a Tg by DSC of greater than about 40° C., so that the powders made from such resins are storage stable, preferably greater than about 55° C., an epoxy functionality of about 2 or greater, preferably about 2 to 4, and epoxide equivalent weight of about 600 to 1100, preferably about 600 to 750.

In accordance with the present invention, the non-crystalline epoxy resin is blended with a sufficient amount of crystalline epoxy resin to reduce or eliminate bubble entrapment upon low temperature curing. The crystalline epoxy resins useful herein are preferably solid resins which have a Tm by DSC of greater than the Tg of the non-crystalline resin, preferably greater than about 90° C., so that the powders made from such resins can be melt-processed in a conventional extruder without a) causing substantial processing delays while waiting for the crystalline resins to recrystallize and b) substantial reduction in the storage stability of the powder as a result of destruction of crystal structures, an epoxy functionality of about 2 or greater, preferably about 2 to 3, and an epoxide equivalent weight of about 50 to 500, preferably about 100 to 300. Such resins can be produced by conventional techniques, such as by reacting epichlorohydrin with a di- or polyhydric monomer known to have limited rotation with epichlorohydrin.

Examples of suitable crystalline epoxy resins include, without limitation, prepolymers selected from the group consisting of tetramethylbisphenol diglycidyl ether, bisphenol S diglycidyl ether, 2,5-di-t-butylbenzene-1,4-diglycidyl ether, hydroquinone diglycidyl ether, 2,5-di-t-butylhydroquinone diglycidyl ether, terephthalic acid diglycidyl ether, diglycidyl isophthalate, triglycidyl isocyanurate, and epoxypropoxydimethylbenzyl acrylamide, which are also described in U.S. Pat. No. 5,414,058, the teaching of which is incorporated by reference herein in its entirety. Tetramethylbisphenol diglycidyl ether is a particularly preferred crystalline epoxy resin in this invention.

The amount of crystalline substance incorporated in the powder coating composition is critical to the success of this invention. Only a threshold minimum amount of the above crystalline resin is required to produce the desired results. While this critical lower limit can vary depending upon the particular crystalline substance employed, in general, as little as about 5% by weight of crystalline resin, based on the total weight of crystalline and non-crystalline epoxy resin, will be sufficient to reduce or eliminate bubble entrapment within the coating film when cured at the desired low temperatures. Generally, it has been found that below about 5% by weight crystalline resin, effective bubble reduction cannot be attained in most cases. Amounts greater than this minimum level of crystalline resin can, of course, be employed, although at some point the increase in low temperature degassing properties is substantially outweighed by a substantial decrease in melt-processability and shelf stability of the powder composition such that the powder composition is rendered impractical for commercial use. Generally, it has been found that when the crystalline resin exceeds an upper limit of about 15% by weight, the storage stability of the powder coating, in particular, tends to become extremely poor as a result of severe blocking at ambient temperatures, rendering the powder impractical for commercial use. Therefore, in a preferred embodiment of this invention, the amount of crystalline epoxy resins is generally about 5–15% by weight, based on the total weight of the crystalline and non-crystalline epoxy resins.

A curing agent is typically incorporated in the powder coating of this invention to crosslink the epoxy resins at the epoxy sites and provide the desired thermoset properties to the coating, although it is possible to cure the coating without a curing agent. The curing agents useful herein are preferably solid materials having at least two functional groups reactive with the epoxy groups. Examples of suitable curing agents include, without limitation, dicyanodiamide, bisphenol A, bisphenol S, bisphenol A epoxy adduct of an aliphatic polyamine having a primary or secondary amino group, with dicyanodiamide being preferred. Generally, the curing agent is used in an amount of 0.7–1.7 equivalents, preferably 1.1–1.4 equivalents of the functional group per one equivalent of the epoxy group present in the powder coating composition. Typically, this translates to a range of about 3 to 7 phr of curing agent in the powder coating composition, preferably about 4.5 to 5.5 phr.

Although it is possible to cure or crosslink the powder coating without the use of catalysts, it is usually desirable to employ a cure catalyst in the powder coating composition of this invention to permit the curing reaction to progress at commercially acceptable rates. The cure catalysts useful herein are preferably solid materials known to promote an epoxy ring opening function and the formation of ether linkages between epoxy resins. Particularly preferred catalysts include, without limitation, 2-methyl imidazole, 2-phenyl imidazole, as well as bisphenol A epoxy adducts of the aforesaid imidazoles if lower temperatures/faster cures are desired. Generally, the amount of catalysts employed in the powder coating ranges from about 0.01 to 0.3 phr, preferably about 0.05 to 0.1 phr. The powder coating composition of this invention may be clear, i.e., unpigmented or unfilled, or contain standard pigments and fillers to impart the desired color and opacity to the coating film, although the benefits of this invention are most effectively achieved in clear formulations. By "clear", it is meant that the powder coating composition is essentially free of opaque pigments and fillers, so that it will produce cured coating films that are essentially transparent.

In addition to the above components, the thermosetting powder coating composition of this invention may contain the usual additives such as, without limitation, standard dry flow additives, flow control agents, leveling agents, degassing agents, antioxidants, uv absorbers, light stabilizers, etc. The cure temperatures of the above powders will vary somewhat depending on the various ingredients employed. However, it is particularly important that the coating powders possess the ability to cure at low temperatures without trapping bubbles within the cured coating film formed therefrom. Substrates susceptible to outgassing and/or degradation upon heating, such as brass parts, generally require a cure temperature below about 350° F. In accordance therewith, it is required that the powder coating of this invention be formulated to cure to a thermoset state at temperatures below about 350° F., preferably between about 325° F. and 350° F., within commercially reasonable times, e.g., 30 minutes or less, preferably 15 minutes or less, while still producing essentially bubble-free and haze-free coating films. Preferably, the powder coating composition of this invention will experience little or no bubble entrapment throughout the entire cure schedule.

Powder coatings of this invention are prepared in the usual manner. First, an intimate mixture is formed by dry blending together all of the formulation ingredients in a mixer. The dry blend is then melt-blended in a mixing extruder with heating above the melting point of the resin and other ingredients, where necessary, so that the extrudate is a thorough and homogeneous mixture. Extrusion is preferably carried out at temperatures either below or close to the Tm of the crystalline epoxy resin for efficient melt-processing and desired storage stability. Gaseous or supercritical fluid, e.g., $CO_2$, may be charged to the extruder for better control of the extrusion temperatures. Thereafter, the extruded composition is rapidly cooled and solidified and then broken into chips. Next, the chips are ground in a mill with cooling, and, as necessary, the particulates are screened and sorted according to size. Average particle size desired for electrostatic application is generally between about 20 and 60 microns. Once the dry, free-flowing, powders of this invention, which now contain at least one non-crystalline epoxy resin and at least one crystalline epoxy resin, are produced, they are ready for application onto a substrate to be coated.

The powder coatings of this invention can then be applied to the substrate by any conventional powder coating technique, although electrostatic application, e.g., electrostatic spraying, is generally preferred. In electrostatic spray coating, electrostatic spray booths are normally employed which house banks of corona discharge or triboelectric spray guns and a reclaim system for recycling the overspray powders into the powder feed. The substrate is heated, at least on the surface, at the time of application and/or subsequently to a temperature equal to or above the temperature needed to cure the powder coating and below the substrate outgassing and/or degradation temperature, so that the coating particles sufficiently melt, flow and form a smooth continuous coating film, and then cure to a thermoset state without degrading the substrate. Heating can be performed in infrared, convection ovens, or a combination of both, although infrared ovens are preferred. Time and temperature of the final cure will vary somewhat depending on the coating powders employed and conditions of use. However, regardless of cure time and temperatures employed, provided that the powder ingredients have been sufficiently melted before curing, the coating films generated on the substrates will have a visually consistent apperance and will be without entrapped bubbles that interfere with the aesthetic appearance and distinctness of image required by conventional standards.

The powder coating compositions are particularly suited for application onto metallic substrates, particularly brass, susceptible to outgassing and/or degradation upon heating. Since the above powders are adapted to cure at relatively low temperatures, they are also suited for application onto other types of heat sensitive substrates, such as wood substrates, e.g., hardwood, hard board, laminated bamboo, wood composites, particle board, electrically conductive particle board, high, medium or low density fiber board, masonite board, and other substrates that contain a significant amount of wood, as well as plastics, e.g., ABS, PPO, SMC, BMC, polyolefins, polycarbonates, acrylics, nylons and other copolymers which usually will warp or outgas when coated and heated with traditional heat curable powders, along with paper, cardboard, and heat resistant metallic composites and components having a metallic or non-metallic heat sensitive aspect and possibly having a variable mass. The coatings of this invention are also suited for typical heat resistant substrates, such as high temperature metals, steels, and other alloys, glass, ceramic, carbon and graphite.

This invention will now be described in greater detail by way of specific examples.

EXAMPLE 1

Clear Epoxy Powder Coatings Derived From 0, 1, 5, 10, and 20 Parts Crystalline Resin The following ingredients were melt-blended together in the manner given in the Table below to provide powder coatings derived respectively from 0, 1, 5, 10 and 20 parts crystalline epoxy and 100, 99, 95, 90 and 80 parts non-crystalline epoxy to demonstrate the improvement in bubble entrapment provided by this invention.

| INGREDIENTS | PHR | | | | |
|---|---|---|---|---|---|
| | A | B | C | D | E |
| DRY BLEND IN A KNEADER UNTIL HOMOGENEOUS | | | | | |
| Araldite GT 7013[1] (Non-Crystalline Epoxy) | 100 | 99 | 95 | 90 | 80 |
| Epon RSS 1407[2] (Crystalline Epoxy) | 0 | 1 | 5 | 10 | 20 |
| Dihard 100S[3] (Curing Agent) | 5 | 5 | 5 | 5 | 5 |
| 2-Methyl Imidazole (Catalyst) | 0.1 | 0.1 | 0.1 | 0.1 | 0.1 |
| Baysilone Oil (Leveling Agent) | 0.4 | 0.4 | 0.4 | 0.4 | 0.4 |
| Benzoin (Outgassing Agent) | 0.8 | 0.8 | 0.8 | 0.8 | 0.8 |
| Tinuvin 900[4] (UV Absorber) | 2 | 2 | 2 | 2 | 2 |
| Tinuvin 622[5] (UV Absorber) | 1 | 1 | 1 | 1 | 1 |
| THEN MELT BLEND IN A TWIN SCREW EXTRUDER At 180° F. | | | | | |
| COOL EXTRUDATE AND THEN BREAK INTO CHIPS CHARGE CHIPS AND 0.5% ALUMINUM OXIDE C[6] TO A BRINKMANN MILL THEN GRIND TO POWDER AND SCREEN TO −200 Mesh | | | | | |

Table Footnotes
[1]Araldite GT 7013 is a bisphenol A type epoxy resin having a Tg of 55° C., an epoxy equivalent weight of 650-725, and an epoxy functionality of 1.9 to 2, sold by Ciba Specialty Chemicals.
[2]Epon RSS 1407 is a tetramethylbisphenol diglycidyl ether crystalline epoxy resin having a Tm of 108° C., an epoxy equivalent weight of 166, and an epoxy functionality of 2, sold by Shell Chemical.
[3]Dihard 100S is a dicyanodiamide curing agent, sold by SKW Chemical.
[4]Tinuvin 900 is a benzotriazole uv absorber, sold by Ciba Specialty Chemicals.
[5]Tinuvin 622 is a benzotriazole uv absorber, sold by Ciba Specialty Chemicals.
[6]Aluminum Oxide C is a fumed alumina dry flow additive, sold by Sullivan Associates.

Each powder formulation listed above was electrostatically sprayed with a corona discharge gun onto separate polished brass panels in an amount sufficient to obtain a 2.5–3.0 mil thick dry film on the panel upon curing. After powder application, for bubble testing purposes, the panels were cured first at 250° F. for 5 minutes, allowed to cool to ambient temperature, and then cured further at 325° F. for 3 minutes to generate a clear coating film on the substrate. These panels were then evaluated for bubbles and film clarity. The performance results for the individual coating powders and the coating films formed therefrom are given in the Table below.

| PROPERTY | A | B | C | D | E |
|---|---|---|---|---|---|
| Clarity[1] | Bubbles | Bubbles | No Bubbles | No Bubbles | No Bubbles |
| Blocking[2] | 4 | 4 | 4 | 6 | 10 |

Table Footnotes
[1]The clarity data for each sample was gathered using a Nikon opticai microscope at 200 times magnification through which bubbles were observed.; No bubbles means that virtually no bubbles were observed.
[2]The blocking data for each sample was gathered by placing the powder in a test tube and subjecting the powder to a 100 g weight for 24 hours at 140° F. Powders are rated on a scale of 1 to 10, with 1 being free flowing powder after 24 hours, and 10 being fully sintered material. Blocking resistance of about 6 or below is commercially acceptable.

The results demonstrate the range over which the approach of the invention is effective to eliminate bubble entrapment for the powder coatings. At 1% of crystalline resin, the coating still contains bubbles after cure. At 5% and above, the coatings are bubble free. At 20% crystalline resin, the coating displays extreme blocking which would not make it practical for commercial use.

EXAMPLE 2

Clear Epoxy Powder Coatings Derived From 0 and 5 Parts Crystalline Resin

The following ingredients were melt-blended together in the same manner as in Example 1 to provide powder coatings derived respectively from 0 and 5 parts crystalline epoxy and 100 and 95 parts non-crystalline epoxy to further demonstrate the utility of this invention.

| INGREDIENTS | PHR F | PHR G |
|---|---|---|
| Araldite GT 7013 (Non-Crystalline Epoxy) | 100 | 95 |
| Epon RSS 1407 (Crystalline Epoxy) | 0 | 5 |
| Casamine OTB[1] (Curing Agent) | 5 | 5 |
| 2-Phenyl Imidazole (Catalyst) | 0.05 | 0.05 |
| Baysilone Oil (Leveling Agent) | 0.4 | 0.4 |
| Benzoin (Outgassing Agent( | 0.8 | 0.8 |
| Tinuvin 900[4] (UV Absorber) | 2 | 2 |
| Tinuvin 622[5] (UV Absorber) | 1 | 1 |
| Aluminum Oxide C (Post Blend) | 0.5 | 0.5 |

Table Footnotes
[1]Casamine OTB is 1-(o-toyl) biguanide curing agent, sold by Swan Chemical.

RESULTS

The individual coatings were then tested in the same manner as in Example 1. The results are given in the Table below.

| PROPERTY | F | G |
|---|---|---|
| Clarity | Bubbles | No Bubbles |
| Blocking | 4 | 4 |

The above results confirm that incorporation of at least 5% crystalline epoxy resin into the powder coating compositions eliminates bubble entrapment and prevents a haze from visibly developing on the surface of the coating upon being cured at temperatures safe for brass parts.

From the foregoing it will be seen that this invention is one well adapted to attain all ends and objects hereinabove set forth together with the other advantages which are apparent and inherent. Since many possible variations may be made of the invention without departing from the scope thereof, the invention is not intended to be limited to the embodiments and examples disclosed, which are considered to be purely exemplary. Accordingly, reference should be made to the appended claims to assess the true spirit and scope of the invention, in which exclusive rights are claimed.

What is claimed is:

1. A substrate coated with a powder coating composition comprising
   a film-forming blend of:
   a) at least one non crystalline epoxy resin;
   b) from about 5% to about 15% by weight of at least one crystalline epoxy resin in an amount sufficient amount to reduce or eliminate bubble entrapment within the cured coating film formed from the powder coating composition; and,
   c) at curing agent to facilitate curing of said composition to a thermoset state, wherein incorporation of said crystalline epoxy resin reduces or eliminates bubble entrapment within the cured coating film formed from the powder coating composition when said composition is cured to a thermoset state at temperatures of below about 350° F.

2. A substrate coated with a powder coating composition comprising
   a film-forming blend of:
   a) at least one non-crystalline epoxy resin having a Tg of greater than about 40° C.;
   b) from about 5% to about 15% by weight of at least one crystalline epoxy resin having a Tm of greater than about 90° C. in an amount sufficient to reduce or eliminate bubble entrapment within the cured coating film formed from the powder coating composition; and
   c) a curing agent to facilitate curing of said composition to a thermoset state; wherein incorporation of said crystalline epoxy resin reduces or eliminates bubble entrapment within the cured coating film formed from the powder coating composition when said composition is cured to a thermoset state at temperatures below 350° F.

3. A brass substrate clear coated with the powder coating of claim 1, and wherein the coated brass substrate resulting contains trapped bubbles in an amount insufficient to produce a visible haze in the cured coating film formed from said powder coating.

* * * * *